Patented Apr. 30, 1946

2,399,345

UNITED STATES PATENT OFFICE 2,399,345

ESTERS OF ENDOALKYLENE HYDROAROMATIC ACIDS

Henry G. Goodman, Jr., Pittsburgh, Pa., assignor to Carbide and Carbon Chemicals Corporation, a corporation of New York No Drawing. Application August 24, 1943, Serial No. 499,826

12 Claims. (Cl. 260—469)

This invention relates to the production of esters of aroyl substituted endomethylene hydroaromatic carboxylic acids and more particularly to esters of ortho aroyl norcamphane carboxylic acids and derivatives thereof.

The new esters of ortho aroyl substituted endomethylene hydroaromatic carboxylic acids with which this invention is concerned have the following general formula:

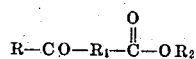

wherein R and $R_2$ represent an aryl or an aralkyl group, and $R_1$ represents an endomethylene hydroaromatic ring nucleus.

These esters are valuable for various industrial uses. They may be employed as softeners or modifiers in various plastic compositions, waxes and polishes, as softening agents for leather, and as high boiling solvents, lubricants, textile assistants, and penetrants, and they are particularly suited as plasticizers for vinyl resins.

Vinyl resins from which plastic compositions containing the new esters may be made are those which may be formed by the polymerization or condensation of vinyl compounds, such as vinyl acetate, vinyl propionate, vinyl butyrate, vinyl chloride, vinyl bromide, or styrene. Polyvinyl acetal resins, which may be formed by the partial or complete reaction of aldehydes with polyvinyl alcohol or incompletely hydrolyzed polyvinyl esters are also included within the group of vinyl resins. A particularly desirable type of vinyl resin for use in the plastic compositions is that which may be formed by the conjoint polymerization of vinyl halides with vinyl esters of aliphatic acids.

In general, the new esters of this invention may be prepared by reacting an ortho aroyl substituted endomethylene hydroaromatic carboxylic acid with a suitable esterifying compound, for instance, an aliphatic hydroxy compound, in the presence of an acid esterification catalyst. The reactants are dispersed or dissolved in a diluent or solvent and, if desired, an excess of the esterifying compound, e. g. an alcohol, may serve as the solvent. Esterification may be carried out by admixing both reactants in substantially stoichiometric amounts in the presence of benzene or other suitable water-immiscible organic solvent and thereafter heating the resulting mixture to a refluxing temperature. Water formed during the reaction is immediately removed preferably as an azeotropic distillate. After a suitable refluxing period the mixture is distilled to remove benzene and the resulting residue distilled at reduced pressure to recover the ester as a distillate. Alternatively, the ester may be recovered by dissolving the reaction mass in a solvent and crystallizing the ester from the resulting solution.

Acid esterification catalysts, which may be successfully employed in preparing the new esters of the invention, include substantially anhydrous hydrogen chloride and sulfuric acid. Substantially dry gaseous hydrogen chloride may be passed, just prior to esterification, into either reactant although it is preferred to pass it into the esterifying compound until an amount of gas up to about 5% by weight of such compound has been absorbed. Alternatively, the catalyst may be added directly to the water-immiscible solvent immediately prior to esterification or to the reaction mixture during esterification.

Ortho aroyl substituted endomethylene hydroaromatic carboxylic acids employed as a starting material for preparing the new esters of this invention, may be conveniently prepared by condensing an aryl or aralkyl hydrocarbon with an endomethylene hydroaromatic ortho carboxylic anhydride as described in my copending application Serial No. 499,825, filed August 24, 1943.

Suitable esterifying compounds for reaction with the above-described type of acids include open-chain and alicyclic alcohols, aliphatic and aromatic glycols and glycol ethers, and particularly aliphatic open-chain alcohols containing up to about 10 carbon atoms in the molecule.

By way of illustration, the invention will be described as applied to the preparation of alkyl esters of ortho aroyl norcamphane carboxylic acids, but it is to be understood that the invention may be applied to the preparation, in general, of any ester of an ortho aroyl substituted endomethylene hydroaromatic carboxylic acid.

EXAMPLE I

*Ethyl ester of 2-benzoyl-3-carboxy norcamphane*

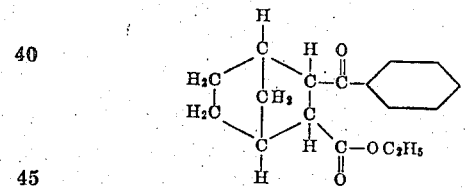

Substantially dry hydrogen chloride was passed into 430 parts by weight (9.3 mols) of substantially anhydrous ethyl alcohol until approximately 17 parts by weight of hydrogen chloride had been absorbed. To this solution, 244 parts by weight (1 mol) of 2-benzoyl-3-carboxy norcamphane were added and the resulting mixture was allowed to stand at room temperature for 16 hours. At the end of this period the mixture was then heated to a refluxing temperature for 4 to 5 hours and thereafter distilled to remove excess ethanol and hydrogen chloride. After washing the residue with water, 147 parts by weight of the ethyl ester of 2-benzoyl-3-carboxy norcamphane, representing a yield of 54%, was distilled therefrom at 207–227° C. at 10 mm. Hg absolute pressure, and it solidified on cooling. It exercised a plasticizing action when incorporated in vinyl resins.

EXAMPLE II

N-butyl ester of 2-benzoyl-3-carboxy norcamphane

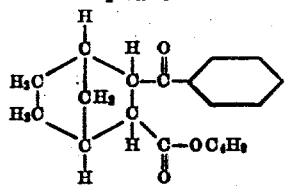

Following the procedure of Example 1, the n-butyl ester of 2-benzoyl-3-carboxy norcamphane was obtained by the esterification of 244 parts by weight (1 mol) of 2-benzoyl-3-carboxy norcamphane with 693 parts by weight (9.3 mols) of substantially anhydrous n-butanol in the presence of 2.7 parts by weight of anhydrous hydrogen chloride. The resulting n-butyl ester of 2-benzoyl-3-carboxy norcamphane distilled at 203–227° C. at 4 mm. Hg absolute pressure, and 194 parts by weight were recovered, amounting to a yield of 64%.

EXAMPLE III

Ethyl ester of 2-toluoyl-3-carboxy norcamphane

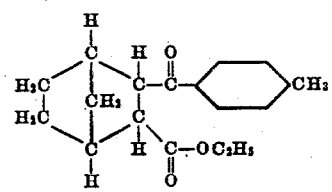

In accordance with the procedure of Example 1, substantially anhydrous hydrogen chloride was passed into 300 parts (6.5 mols) by weight of absolute ethyl alcohol until approximately 12 parts by weight of hydrogen chloride had been absorbed. To this solution, 100 parts by weight (0.38 mol) of 2-toluoyl-3-carboxy norcamphane were added, the mixture was then heated to a refluxing temperature for two hours and allowed to stand overnight. The mixture was distilled on a water bath to remove hydrogen chloride and unreacted alcohol, and the residue poured into a large volume of water. The resulting precipitate was filtered, washed with water and a 2% sodium carbonate solution, dried, and recrystallized from a solution thereof in ethanol. The ethyl ester of 2-toluoyl-3-carboxy norcamphane was found to have a melting point of 78–79° C. and 96 parts by weight were obtained, amounting to a yield of 87%.

EXAMPLE IV

N-butyl ester of 2-toluoyl-3-carboxy norcamphane

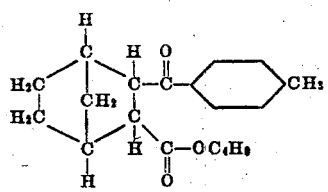

A mixture of 86 parts (0.33 mol) by weight of 2-toluoyl-3-carboxy norcamphane, 26 parts (0.35 mol) by weight of n-butanol, 87 parts (1.1 mols) by weight of benzene and 0.9 part by weight of concentrated sulfuric acid was refluxed and the water formed during esterification was continuously removed. After the formation of water ceased, the reaction mixture was allowed to cool, washed with water, neutralized with a dilute sodium carbonate solution and thereafter distilled to remove benzene and unreacted materials. Pure n-butyl ester of 2-toluoyl-3-carboxy norcamphane was distilled from the residue at 218–220° C. and at 4 mm. Hg absolute pressure, and 80 parts by weight were obtained, amounting to a yield of 77%.

EXAMPLE V 2-ethyl hexyl ester of 2-benzoyl-3-carboxy norcamphane

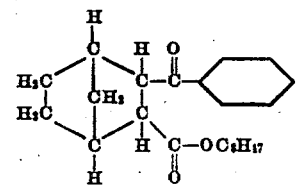

Following the procedure of Example IV, 122 parts (0.5 mol) by weight of 2-benzoyl-3-carboxy norcamphane, 72 parts (0.55 mol) by weight of 2-ethyl hexanol, 1.8 parts by weight of concentrated sulfuric acid, and 175 parts (2.2 mols) by weight of benzene were refluxed, the residue washed and distilled. The resulting 2-ethyl hexyl ester of 2-benzoyl-3-carboxy norcamphane distilled at 228° to 232° C. at 4 mm. Hg absolute pressure, and 141 parts by weight were obtained, amounting to a yield of 79%.

EXAMPLE VI

N-butyl ester of 2-(ethyl benzoyl)-3-carboxy norcamphane

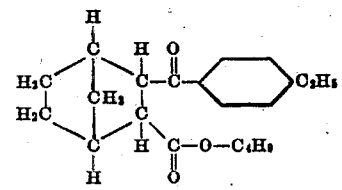

In accordance with the procedure of Example IV, a mixture of 91 parts (0.33 mol) by weight of 2-(ethyl benzoyl)-3-carboxy norcamphane, 27 parts (0.36 mol) by weight of n-butanol, 0.9 part by weight of concentrated sulfuric acid, and 87 parts (1.1 mols) by weight of benzene was refluxed with the continuous removal of water, the resulting residue washed, and then distilled to remove benzene. The resulting n-butyl ester of 2-(ethyl benzoyl)-3-carboxy norcamphane distilled at 215° to 219° C. at 3 mm. Hg absolute pressure, and 77 parts were obtained, amounting to a yield of 70%.

It is to be noted that in the foregoing formulae substituents in the aromatic ring have been represented as being in the para position but it is to be understood that the presence of one or more substituent groups in other positions is not necessarily excluded.

The above descriptions are intended as illustrations and not as limitations of the invention. In view of the foregoing disclosures, variations of the invention may be practiced by one skilled in the art, and such variations are intended to be within the scope of the invention.

What is claimed is:

1. A process for preparing esters of 2-aroyl-3-carboxy norcamphane which comprises reacting an organic hydroxy compound with a 2-aroyl-3-carboxy norcamphane in the presence of an acidic esterification catalyst.

2. A process for preparing esters of 2-aroyl-3-carboxy norcamphane which comprises reacting, in the presence of an acidic catalyst, an aliphatic hydroxy compound with a 2-aroyl-3-carboxy norcamphane, continuously removing water from said reaction and recovering the resulting ester from such reaction mixture.

3. A process for preparing esters of 2-aroyl-3-carboxy norcamphane which comprises reacting in the presence of an acidic catalyst, and a water-immiscible diluent, an aliphatic alcohol with a 2-aroyl-3-carboxy norcamphane, continuously removing the water formed during the reaction as an azeotropic distillate, and thereafter recovering the resulting ester from such reaction mixture.

4. As new chemical compounds, esters of ortho aroyl substituted endomethylene hexahydrophthalic acids, and containing up to 10 carbon atoms in the ester radical.

5. As new chemical compounds, aliphatic esters of 2-aroyl-3-carboxy norcamphanes.

6. As new chemical compounds, aliphatic esters of 2-benzoyl-3-carboxy norcamphanes.

7. As new chemical compounds, aliphatic esters of 2-toluoyl-3-carboxy norcamphane.

8. As a new chemical compound, the ethyl ester of 2-benzoyl-3-carboxy norcamphane.

9. As a new chemical compound, the butyl ester of 2-toluoyl-3-carboxy norcamphane.

10. As a new chemical compound, the 2-ethyl hexyl ester of 2-benzoyl-3-carboxy norcamphane.

11. A process for preparing the ethyl ester of 2-benzoyl-3-carboxy norcamphane which comprises reacting ethanol with 2-benzoyl-3-carboxy norcamphane, in the presence of an acidic catalyst, and recovering the said ethyl ester of 2-benzoyl-3-carboxy norcamphane.

12. A process for preparing the ethyl ester of 2-benzoyl-3-carboxy norcamphane which comprises refluxing 2-benzoyl-3-carboxy norcamphane with excess ethanol, in the presence of an acid catalyst, removing unreacted ethanol, and thereafter distilling said ethyl ester of 2-benzoyl-3-carboxy norcamphane at a temperature of about 207–227° C. at about 10 mm. Hg absolute pressure.

HENRY G. GOODMAN, Jr.